United States Patent [19]
Bickel

[11] 4,296,995
[45] Oct. 27, 1981

[54] OPTICAL FIBER BEAM SPLITTER COUPLERS EMPLOYING COATINGS WITH DICHROIC PROPERTIES

[75] Inventor: Gary W. Bickel, Roanoke, Va.

[73] Assignee: International Telephone and Telegraph Corporation, New York, N.Y.

[21] Appl. No.: 117,425

[22] Filed: Feb. 1, 1980

[51] Int. Cl.³ .............................................. G02B 5/172
[52] U.S. Cl. ................................ 350/96.15; 350/96.16
[58] Field of Search .......................... 350/96.15, 96.16

[56] References Cited

U.S. PATENT DOCUMENTS

| 3,870,396 | 3/1975 | Racki et al. | 350/96.16 |
| 4,165,496 | 8/1979 | Di Domenico, Jr. et al. | 350/96.15 |
| 4,176,908 | 12/1979 | Wagner | 350/96.15 |

FOREIGN PATENT DOCUMENTS 2614051  9/1977  Fed. Rep. of Germany ... 350/96.15

OTHER PUBLICATIONS

G. Bickel et al., "Bidirectional Coupler for Full Duplex Transmission on a Single Optical Fiber", SPIE vol. 139, 1978, pp. 63–69.

Bloem et al., "Fiber-Optic Coupler", in *IBM Tech. Disc. Bull.* vol. 16, No. 1, Jun. 1973, pp. 146–147.

"Simple Coupler Taps Fiber-Optic Cables", in *Electronics*, Dec. 1973, p. 30.

*Primary Examiner*—Stewart J. Levy
*Attorney, Agent, or Firm*—John T. O'Halloran; Peter C. Van Der Sluys

[57] ABSTRACT

A single fiber of any glass type is cut at a suitable angle and both halves are then polished at the end surfaces. A layer of material having dichroic properties or multiple layers are then deposited on one coupler half and the two halves are rejoined with the angular faces in alignment. Each of the cut fibers are supported in a potting compound. A third fiber is added relatively transverse to the original fibers in order to receive light from the deposited layer. This fiber is associated with one port, while the other fibers are associated with two other ports, thus providing a three port coupler device.

10 Claims, 4 Drawing Figures

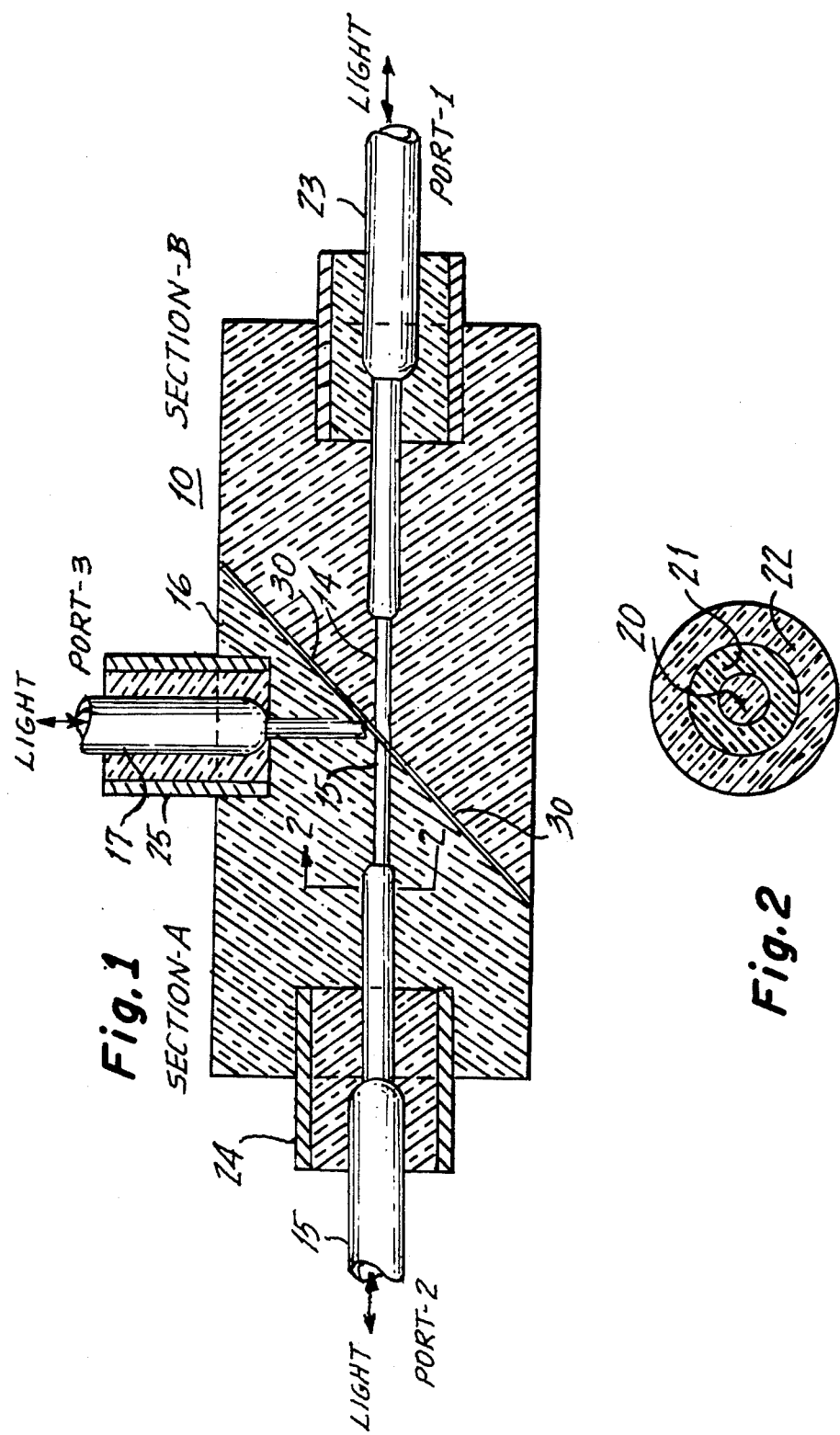

OPTICAL FIBER BEAM SPLITTER COUPLERS EMPLOYING COATINGS WITH DICHROIC PROPERTIES

BACKGROUND OF THE INVENTION

This invention relates to optical couplers and more particularly to an optical coupler employing optical fibers having dichroic reflectors for selective transmission and reflection of light propagating in the associated fibers.

Optical beam splitters operate to divide an incident beam of light into two beams for application to two additional circuits. A beam splitter is a form of coupling device to enable application of the split beams to various alternate circuits included in different circuit paths. A coupler or beam splitter can be employed as a circuit device in various optical systems to enable a designer to gain increased flexibility in system operation.

For example, wavelength multiplexing is an increasingly important concept in the design of fiber optic systems. Presently, there are sources available for the 0.8 to 0.9 um region of low fiber loss, and other sources and detectors are used in various stages of development for greater than 1.0 um wavelengths. Using the appropriate couplers, these sources can be multiplexed and demultiplexed in a given system in order to increase the information capacity, provide security among different communications channels, or to provide other benefits such as bidirectional transmission over a single fiber.

There is a need to provide an efficient optical coupler to enable this type and other types of operation. The coupler may be employed as a beam splitter or multiplexer element as desired and should preferably be capable of bidirectional transmission, while being rugged, small and reliable.

An example of a particularly useful beam splitter coupler employing dielectric or metal coating on fiber surfaces is described in a copending patent application entitled "Optical Beam Splitter Couplers using Metal or Dielectric Coatings" by Gary W. Bickel Ser. No. 74,923 and assigned to the Assignee herein.

This specification describes a beam splitter coupler employing coatings with dichroic properties evaporated or deposited on an angled fiber face to afford reflection and transmission of a light beam propagated by the optical fiber to enable selective coupling of the beam.

DESCRIPTION OF THE PREFERRED EMBODIMENT

An optical coupling device comprising a first optical fiber having a front surface at a given angle and having located thereon a multilayer dielectric coating having dichroic properties capable of reflecting and transmitting a beam of light propagating in said first optical fiber, a second optical fiber having a front surface at said given angle and adjacent said front surface of said first fiber to form an interface between said first and second surfaces to enable transmitted light at said first surface to propagate within said second fiber, and optical means positioned relatively transverse to said interface and adapted to solely receive reflected light from said interface as reflected by said thin layer.

BRIEF DESCRIPTION OF THE FIGURES

Above-mentioned and other features and objects of this invention will become more apparent by reference to the following description taken in conjunction with the accompanying drawing, in which:

FIG. 1 is a schematic view of a beam splitter coupler employing coatings having dichroic properties.

FIG. 2 is a sectional view of an optical fiber taken through line 2—2 of FIG. 1.

DETAILED DESCRIPTION OF THE INVENTION

Figure 3:
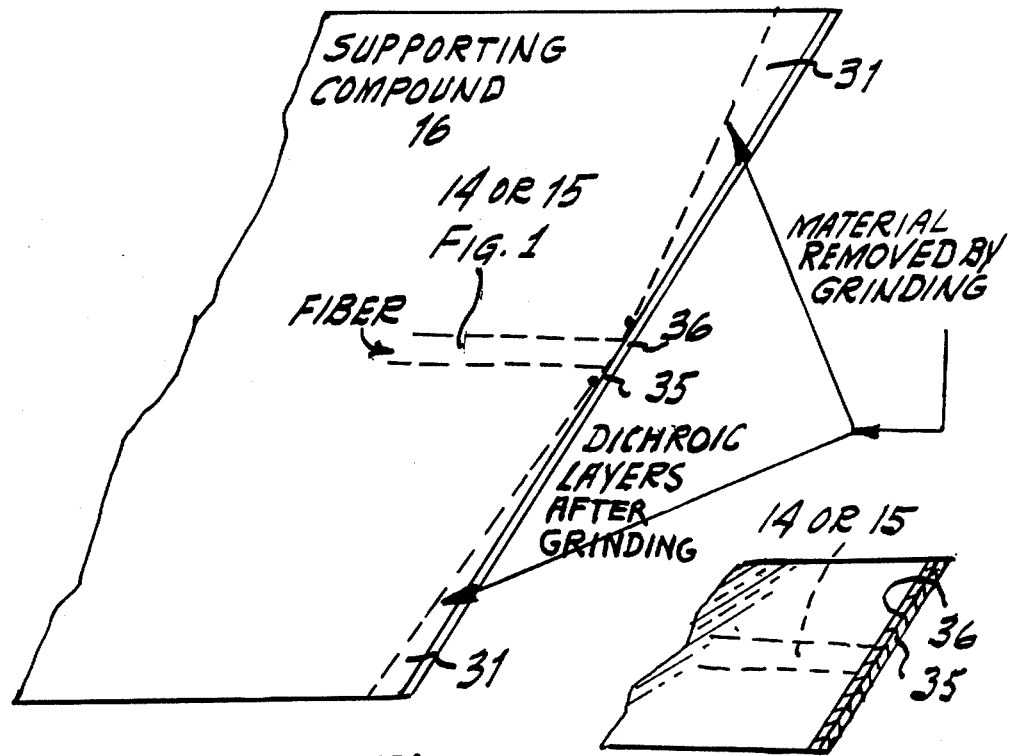
FIG. 3 is a side view of a coated fiber end employing multiple layers of dielectric materials having dichroic properties.
Figure 4:
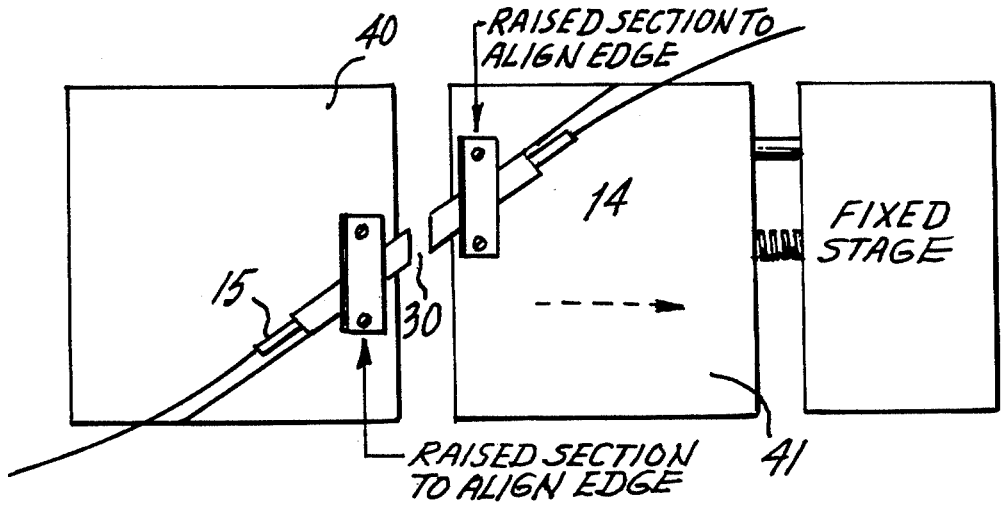
FIG. 4 is a schematic view of an alignment fixture used in the fabrication of the coupler.

In order to gain a clearer understanding of the nature of the device depicted in FIG. 1, it is first convenient to briefly consider the operation of a simple dichroic mirror or dichroic surface used to transmit and receive light at different wavelengths over a typical air path.

The optical properties of the dichroic mirror are based on the constructive and destructive interference of the reflection and transmission of radiation at the successive layers of high and low refractive index materials.

Since in all cases, optically absorbing media are characterized by a complex index of refraction, crystalline absorbing media exhibit a dependence of the optical absorption coefficient in the direction of propagation of light though the crystal and on the state of polarization of the light traveling in a particular direction.

The term pleochroism refers to the variety of effects arising from the dependence of absorption coefficient on direction and polarization. The term dichroism is often used for the same physical phenomenon; this name emphasizing the two different absorption coefficients associated with the two normal modes of propagation in a particular direction.

The classic example of a dichroic material is the natural mineral tourmaline. These crystals are aluminoborosilicates of variable composition, usually having $B_2O_3$ (about 10%), $AL_2O_3$ (20 to 40%) and $SiO_2$ (35 to 40%) with some small amounts of Fe and Cr replacing some of the AL.

Tourmalines absorb the ordinary ray strongly for all colors of the visible spectrum and a plate a few millimeters thick that is cut parallel to the principal axis and used as a filter in a beam of unpolarized light, will give an emergent beam that is almost entirely the extraordinary ray.

The polarizing material called POLAROID consists of an oriented sheet of small organic crystals that are strongly dichroic. There are many other materials which exhibit dichroism and pleochroism and which can be employed with this invention.

Present technology has determined that dichroic transmission and reflection properties (similar to the transmission characteristics of single layer dichroic materials) can be achieved using multilayer dielectric coating technology. Hence, by the use of suitable dielectric coatings or layers one can achieve dichroic reflectors with both transmission and reflection properties being highly dependent on both wavelength and polarization. Thus, multilayer coatings used to create transmission and reflection characteristics which are wavelength dependent are properly termed dichroic. Hence, the term dichroism as employed herein refers to the selective absorption and transmission of light as a function of wavelength regardless of the plane of vibration.

This technology, as indicated, is used to produce optical filters with excellent throughput and rejection characteristics. A dichroic mirror designed for reflection at 1.06 um and transmission at 0.84 um may have a reflectivity of greater than 99% and a transmission on the order of 82% at these wavelengths for as few as fifteen to seventeen layers of a dichroic material. Thus, the coupling efficiency in transmission would be on the order of −0.86 dB and in reflection −0.04 dB.

Referring to FIG. 1, there is shown a schematic diagram of a fiber dichroic beam splitter 10. Numerals 14 and 15 reference first and second bare optical fibers potted in a suitable compound 11 which may be a potting compound or an epoxy. Essentially, the fibers 14 and 15 are first stripped of their outer jacket, cut in half at an angle of about 45° to form an interface 30. The cut fibers 14 and 15 are then rejoined after deposition by an evaporation technique of a multilayer dichroic reflector on the surface of one fiber and at the interface 30. The angle of 45° is only by way of example and angles between 20° to 45° or more will suffice as well.

The coupler configuration 10 of FIG. 1 consists essentially of three optical fibers 14,15 and 17, all secured together in a suitable epoxy or potting compound and optically coupled by a dichroic mirror deposited on the angled front surfaces of fibers 14 or 15 or on both surfaces. The fibers 14 and 15 as emplaced in the epoxy support 16 are bare fibers as shown in cross section in FIG. 2. The bare fiber consists of an inner core 20 surrounded by a concentric cladding layer 21, which in turn is surrounded by a substrate layer 22. The fibers 14 and 15 each are associated with an input or output port; Port 1 for 14, Port 2 for 15. The jacketed fibers 14 are surrounded by a metal or other material tube 23 to supply transverse strain relief to the fiber 14 as it emerges from the epoxy or potting region 30. Similarly, the fiber 15 is surrounded by a similar tube 24 as it emerges from the potting support 16. Another fiber 17 of a predetermined bare length has a front surface in contact with or in close proximity to the interface 30 between fibers 14 and 15. The fiber 17 is surrounded by a metal or other material tube 25 as it emerges from the potting compound 16 and serves as a third port (Port 3). The fiber 17 is shown relatively transverse to fibers 15 and 23 with the tip or end of fiber 17 slightly offset from the interface to receive maximum reflected light.

The configuration depicted in FIG. 1 is mechanically rugged by virtue of the single piece construction. Fiber retention in the package is achieved by the combination of the bare fiber lengths and processing techniques to assure strong adherence by the potting compound 16 to achieve up to two pounds termination load. The total package is about two inches long by one and one-half inches wide, not including the fiber pigtails.

FABRICATION OF THE COUPLER 10

The processing steps involved in producing the fiber dichroic coupler are:
(1) Fiber jacket removal and cleaning;
(2) Fiber substrate etching;
(3) Potting;
(4) Polishing;
(5) Application of the dichroic coating;
(6) Assembly stage.

The first step involves the mechanical stripping of the fiber jacket. An optical fiber is jacketed by means of a suitable elastomeric material to provide protection and support to the fiber assembly (FIG. 2). The jacket is mechanically stripped from the fiber by employing a sharp blade. This is followed by an ultrasonic cleaning step to remove the remnants of the jacket in a solvent for the inner jacket material.

The second process is a selective etching of the substrate layer 22. A suitable etchant such as an acid may be employed. The step of etching the substrate is used to improve the coupler efficiency and to provide closer coupling between fibers 14 and 15 and the transverse fiber 17 associated with Port 3.

The potting process emplaces the fiber which is to be cut and uses a mold and a potting compound to secure the fiber in place prior to forming fibers 14 and 15 from the single fiber. The metal or other material tubes 23, 24, are positioned in the mold for insertion of the the fiber therethrough to provide strain relief. The potting compound is then added to the mold and is cured at several temperature levels.

The emplaced fiber is then cut in the mold and the end surfaces of the two sections are polished. The cut ends as shown in FIG. 3 of the fiber sections 14 or 15 are polished by standard optical polishing techniques. A predetermined amount of material 31 is removed by a grinding process to reduce the potential for fiber end separation or interface separation due to the end surfaces of fibers 14 and 15 being angularly misaligned during the assembly process.

After polishing and grinding the surface, selective multilayer coatings 35 and 36 are applied to the fiber end faces (FIG. 3). The faces of the fiber as 14 are cleaned and then coated with a dielectric material by a standard evaporation technique to form a dichroic mirror.

During the first stage assembly, the fiber 15 is mounted on the movable section 40 of a three axis positioner. The fiber 14 is emplaced on the fixed stage section 41. The fibers 14 and 15 are moved using a light source and a detector to provide an alignment signal which increases in magnitude until optimum coupling is achieved. Epoxy is then added to the interface region 31 before alignment and is then heat cured after alignment is complete.

The final assembly consists of drilling an acceptance hole for insertion of fiber 17. A microscope is required during the drilling operation to achieve minimum separation between the fibers. Observation is accomplished by focusing through the polished side of the assembly. Fiber 17, with metal or other material tube 25, is emplaced and then epoxied within the assembly. The above technique is one way of constructing such a coupler and alternative approaches do exist.

The selection of the functional characteristics of the ports associated with the fibers is determined by the geometry of the device 10 of FIG. 1. For example, the coupler geometry dictates that Port 2 (fiber 15) be the through-port because it is the only port with a direct optical coupling to both of the other Ports 1 and 3. The coupling between Port 2 and the other two ports is inherently different. Port 2 to Port 3 involves transmission through an unguided region involving beam spread, whereas Port 2 to Port 1 and vice versa, does not. This last effect influences the choice of input and output ports when taken into consideration with other aspects of the optical link configuration. It is noted that it is not necessary that fiber 17 and fiber 15 be of the same type or core diameter and hence, can be different modes and different diameters.

In the fiber dichroic beam splitter 10, the radiation striking the dichroic layers is not colimated but contains radiation at angles to the fiber axis up to the limit defined by the fiber refractive indices. In a fiber (14) of 0.22 numerical aperture (NA) and 1.47 refractive index, the maximum half angle for guided radiation within the fiber is 8.6° (12.7° external to the fiber). For a choice of optimum destructive refractive interference at 45° incident angle relative to the fiber axis (nd cos 45 = $\lambda/2$), the degradation of the phase from the optimum conditions would be 0.4 at the extreme angles. Hence, only a slight degradation will occur in the reflection and transmission properties of the fiber dichroic mirror relative to the collimated beam. However, for step index and graded index fibers having the same refractive index difference between the cladding layer and the central region of the core, the radiation propagating in the core is more concentrated along the fiber axis of the graded index fiber, so that the effective degradation in the graded index fiber will be less than in the step index fiber.

The important characteristics of the coupler 10, such as transmission throughput loss, reflection throughput loss and external cross talk rejection are dependent on the performance of the dichroic coatings or layers as 35 and 36. Such dichroic coatings are employed to transmit from 0.8 to 0.9 um and to reflect in the greater than 1.0 um region and are referred to as short wave pass or SWP coatings. The complementary coating to reflect from 0.8 to 0.9 um and transmit wavelengths longer than 1.0 um are long wave pass or LWP coatings. With present materials, the SWP coatings exhibit 80% transmission and about 75% reflection, but 90% performance for both transmission and reflection is possible.

The coupler devices exhibit 2 dB excess throughput loss in the transmission or reflection direction when using 55 um core, 0.26 NA graded index fibers for fibers 14 and 15, and 90 um core, step index fibers for 17. Cross talk due to internal device scattering or other imperfections has been measured and found to be −40 dB below the input level.

In summation, devices for wavelength duplexing and bidirectional transmission can be achieved using the above described coupler. Advantages of the coupler include ruggedness, compactness and low cost.

In addition to the bidirectional coupling characteristic of the device, one can fabricate a variety of passive fiber optic devices, which include laser monitor couplers, data bus tap-offs, TDR couplers and beam splitters. All such devices are compact and rugged and are readily connected to sources and detectors via the Ports 1,2 and 3.

As indicated above, one can provide multilayer dichroic reflecting surfaces by the deposition of suitable dielectric layers which then enables the juxtaposed coupler sections to operate on light beams according to the wavelength or frequency of the light. Dielectric layers such as zinc sulfide, titanium dioxide, magnesium flouride and other materials as well can be deposited in suitable layers to provide dichroic reflecting surfaces for particular wavelengths associated with beams of light.

Other materials as well as alternate configurations will become apparent to those skilled in the art upon a reading of this specification and are deemed to be encompassed according to the claims appended hereto.

I claim:

1. An optical coupling device comprising:

a first optical layer having a front surface at a given angle, and having deposited directly thereon by an evaporation technique a plurality of relatively thin layers in excess of ten such layers of a material with dichroic properties capable of reflecting a first beam of light of a first frequency propagating in said fiber, and transmitting a second beam of light of a second frequency propagating in said first optical fiber, a second optical fiber having a front surface at said given angle and adjacent said front surface of said first fiber to form an interface between said first and second surfaces to enable transmitted light at said second frequency to propagate within said second fiber with said second fiber receiving at least 80% of said light at said second frequency, and optical means positioned relatively transverse to said interface and adapted to solely receive reflected light at said first frequency from said interface as reflected by said thin layer with said optical means receiving at least 70% of said reflected light at said first frequency.

2. The optical coupling device according to claim 1 wherein said given angle is between 20 to 45 degrees.

3. The optical coupling device according to claim 1 wherein said first and second fibers are supported as positioned to form said interface by means of an epoxy compound.

4. The optical coupling device according to claim 1 wherein said optical means comprises a third fiber having a front surface located in close proximity to said interface for receiving said reflected light.

5. The optical coupling device according to claim 1 wherein said first and second fibers are fabricated from a single optical fiber cut at a predetermined location at said given angle.

6. The optical coupling device according to claim 1 wherein said first fiber consists of a first section comprising a concentric core and cladding layer, with said angled surface formed at the front end of said first section, said first section integral with a second section having a concentric substrate layer about said cladding layer with the end of said second section furthest from said angled front surface adapted to receive a source of light.

7. The optical coupling device according to claim 6 wherein said second fiber consists of a first section essentially equivalent to said first section of said first fiber and a second section essentially equivalent to said second section of said first fiber.

8. The optical coupling device according to claim 1 wherein said thin layer of dichroic material comprises a plurality of composite layers of material deposited one upon the other to form a composite layer capable of reflecting and transmitting light according to the thickness thereof.

9. The optical coupling device according to claim 1 operative as a beam splitter with said first fiber having a port at one end furthest from said interface, said second fiber having a port at one end furthest from said interface and said third fiber having a port at one end furthest from said interface, each of said ports adapted to receive a source of light for propagating to said other ports.

10. The optical coupling device according to claim 4 wherein said third fiber is positioned relatively transverse to said interface.

* * * * *